Figure 10:
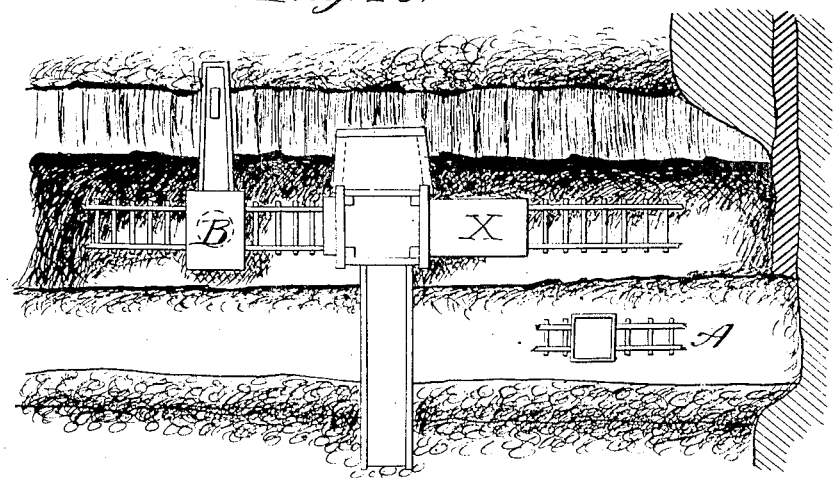

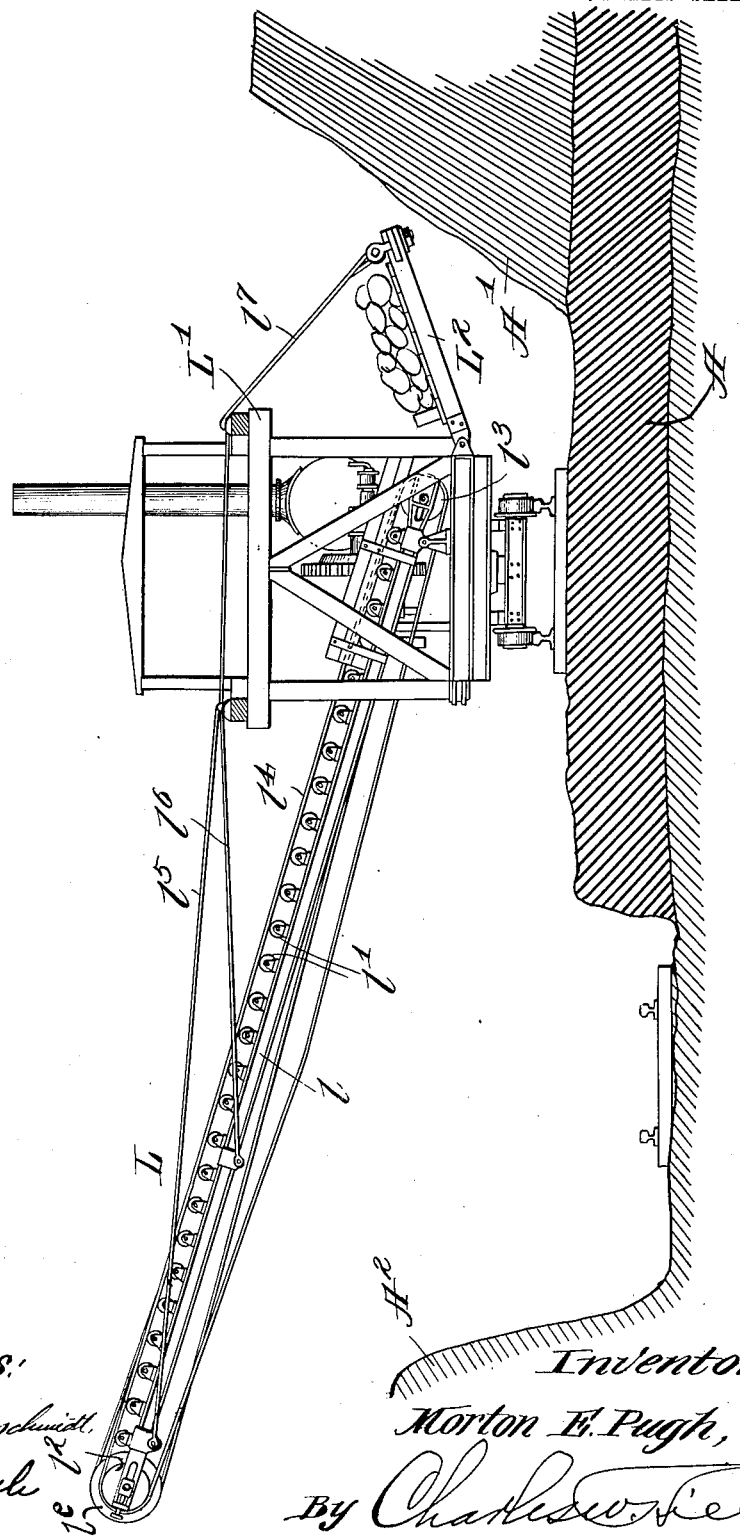

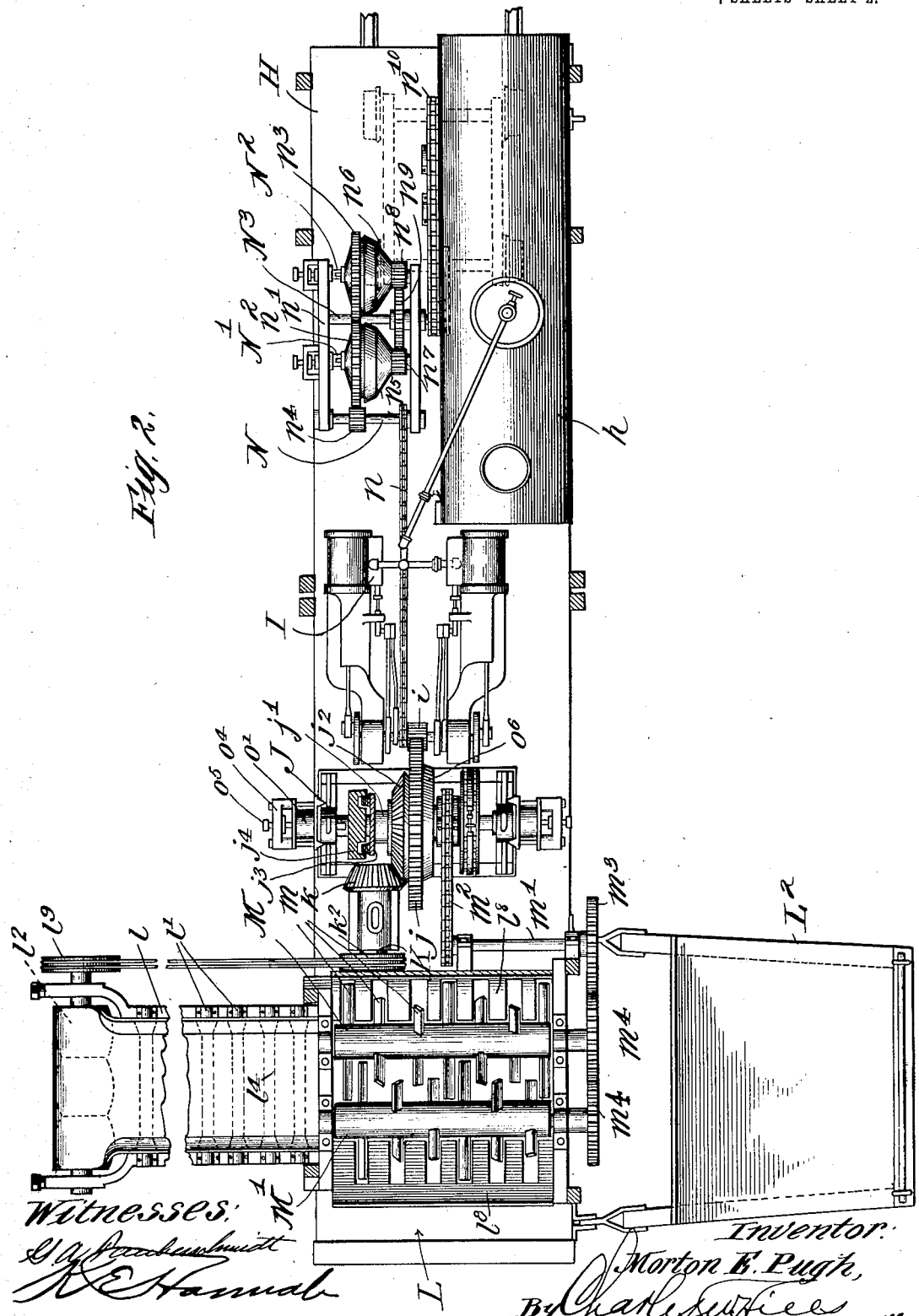

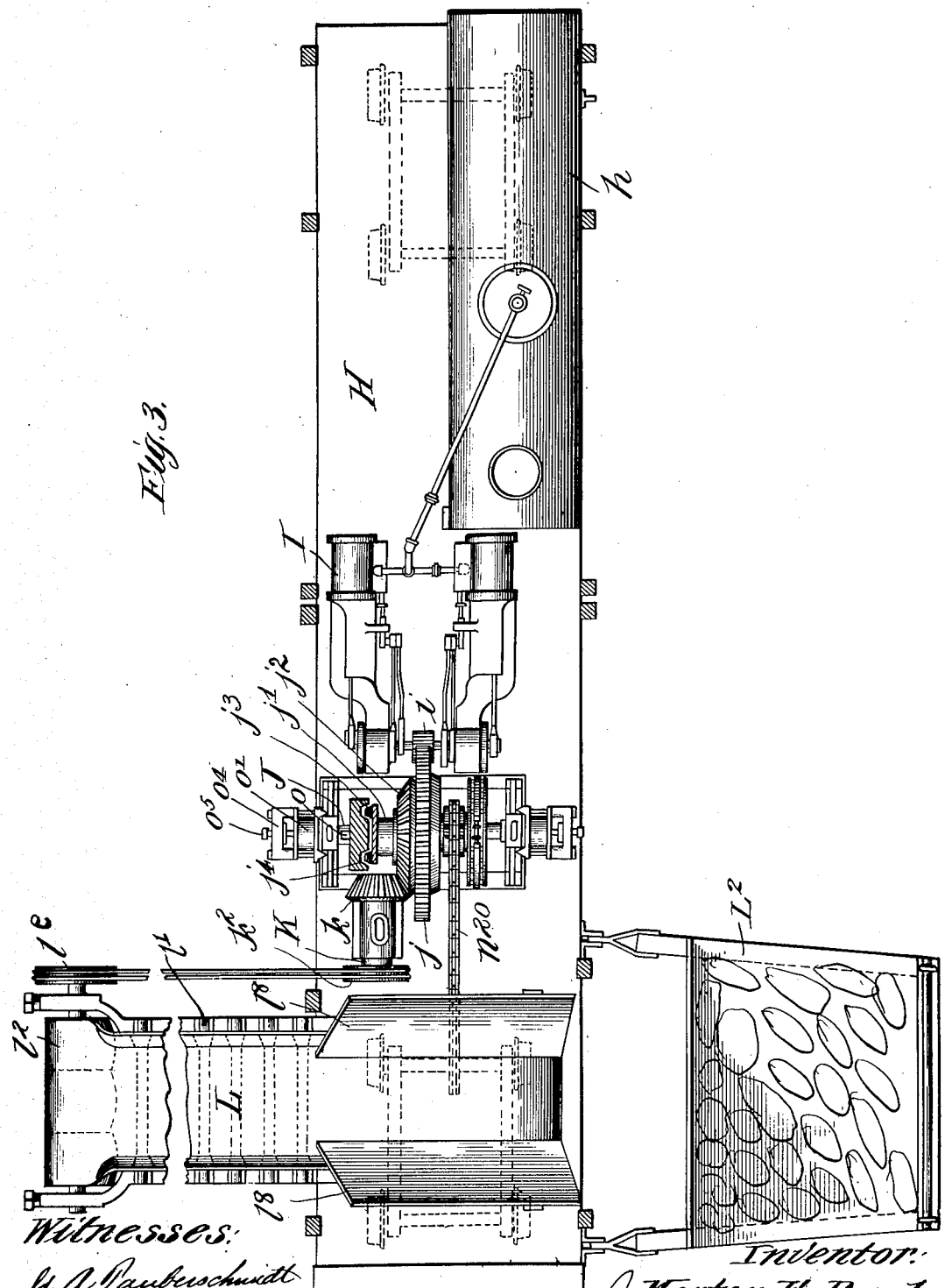

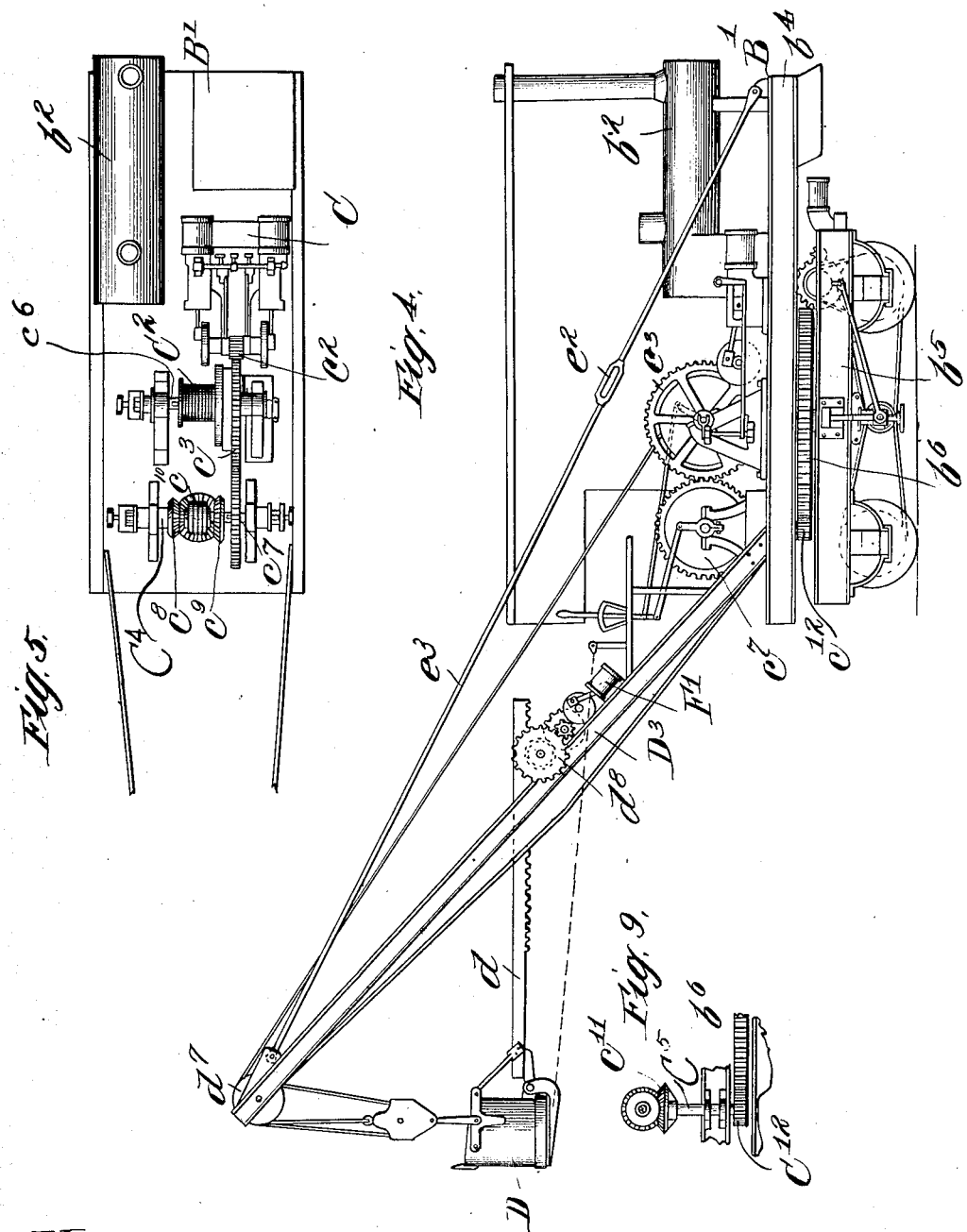

No. 895,586. PATENTED AUG. 11, 1908.
M. E. PUGH.
EXCAVATING, STRIPPING, AND CONVEYING MECHANISM.
APPLICATION FILED APR. 4, 1907.
7 SHEETS—SHEET 5.
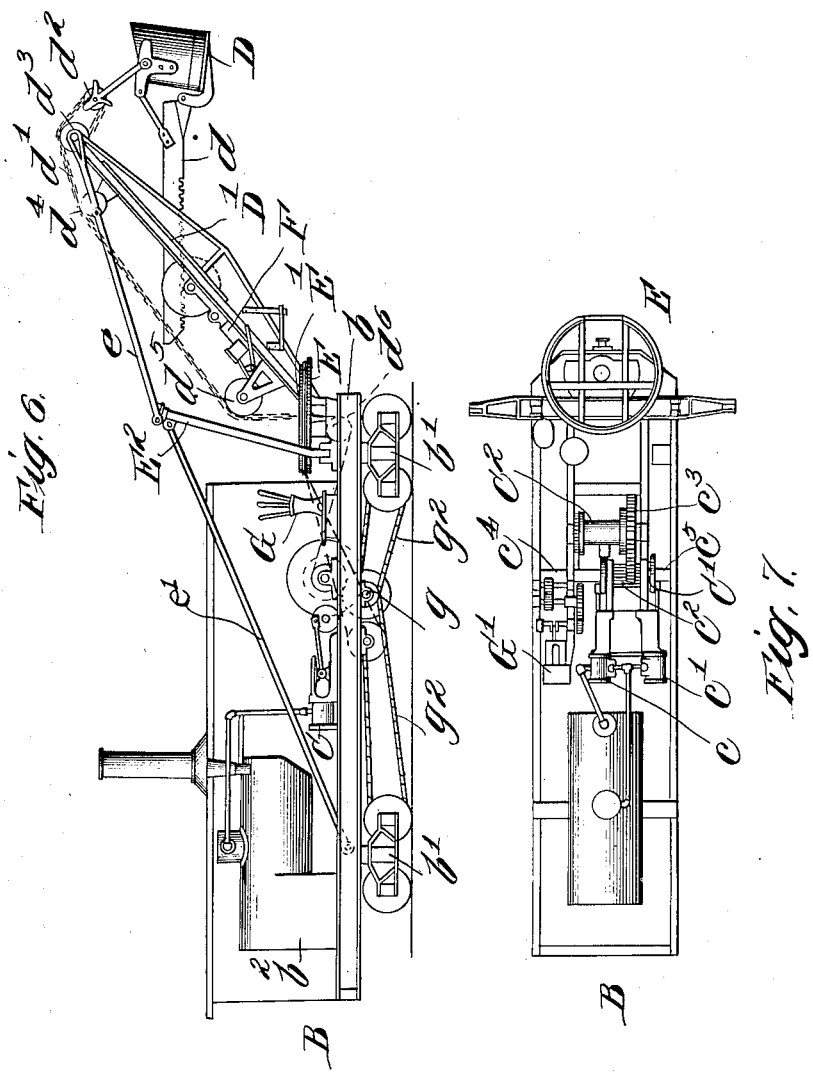
Witnesses:
Inventor:
Morton E. Pugh,
By Charles W. Fees, Atty No. 895,586.  
PATENTED AUG. 11, 1908.  
M. E. PUGH.  
EXCAVATING, STRIPPING, AND CONVEYING MECHANISM.  
APPLICATION FILED APR. 4, 1907.  
7 SHEETS—SHEET 6.
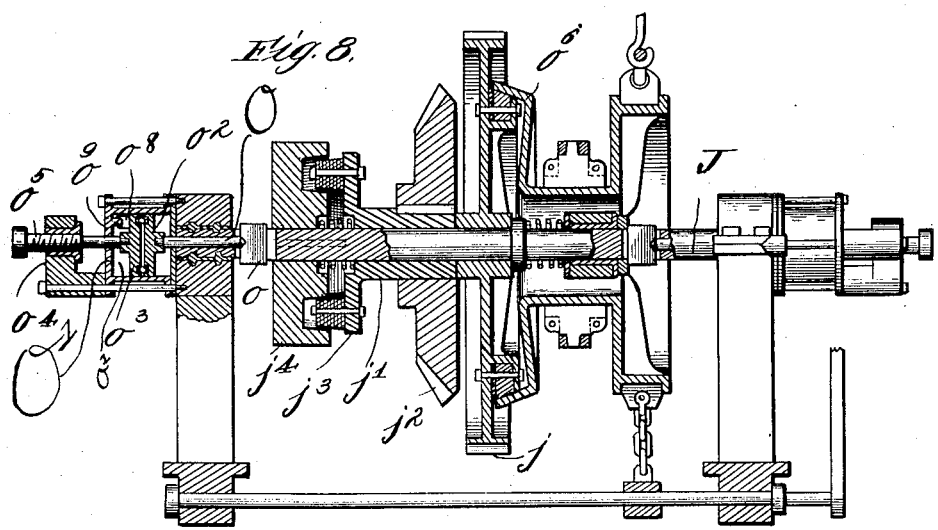
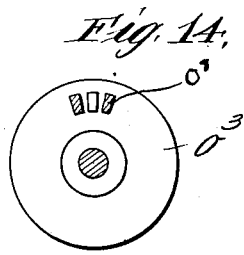
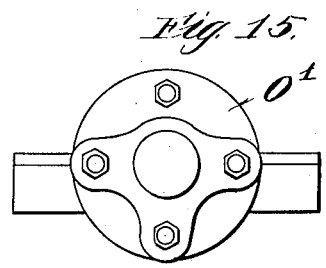
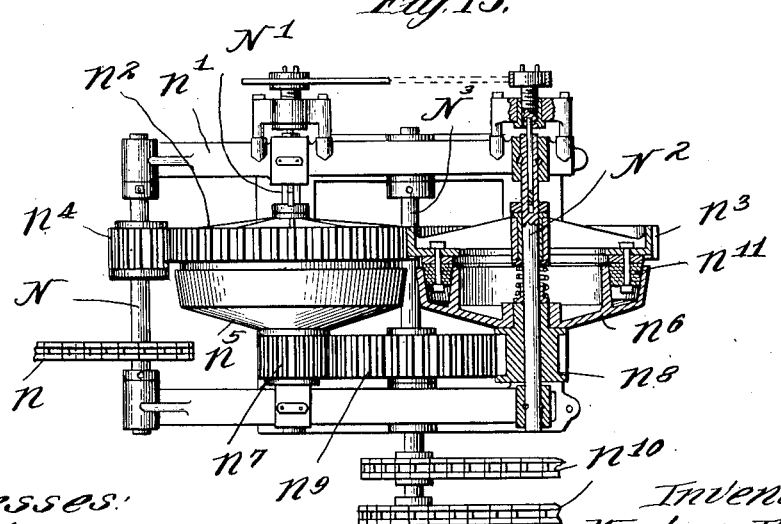

No. 895,586. PATENTED AUG. 11, 1908.
M. E. PUGH.
EXCAVATING, STRIPPING, AND CONVEYING MECHANISM.
APPLICATION FILED APR. 4, 1907.

7 SHEETS—SHEET 7.

UNITED STATES PATENT OFFICE.

MORTON E. PUGH, OF CHICAGO, ILLINOIS.

EXCAVATING, STRIPPING, AND CONVEYING MECHANISM.

No. 895,586.      Specification of Letters Patent.      Patented Aug. 11, 1908.

Application filed April 4, 1907. Serial No. 366,455.

*To all whom it may concern:*

Be it known that I, MORTON E. PUGH, a citizen of the United States, and a resident of the city of Chicago, in the county of Cook and State of Illinois, have invented certain new and useful Improvements in Excavating, Stripping, and Conveying Mechanisms; and I do hereby declare that the following is a full, clear, and exact description of the same, reference being had to the accompanying drawings, and to the letters of reference marked thereon, which form a part of this specification.

It is frequently desirable to strip from considerable areas, the earth overlying beds of coal, stone or other valuable material which it is desired to remove. Such work is very expensive owing to the necessity of transferring the material from the surface for a considerable distance to expose the under stratum to mining operation. The ordinary excavating mechanisms do not operate to advantage for the reason that constant shifting interferes with rapid work. Furthermore in such operation it is usual to transfer or deliver the surface material laterally to the area from which the lower mineral deposit has been removed. For such an operation ordinary steam shovels do not well suffice and owing to the peculiar conditions under which the work is carried forward and the necessity of either working longitudinally with the deposit or transversely the main line thereof, it is necessary to transfer further than is possible with a power shovel.

The object of this invention is to provide coöperating stripping and conveying mechanisms whereby the superposed material may be removed by means of suitable power shovels and delivered therefrom to a self propelling conveyer, movable along the same track or upon a parallel track closely adjacent thereto, and whereby the excavated material stripped from the vein or deposit is delivered laterally to any desired distance.

It is a further object of the invention to provide in connection with a power shovel adapted to rotate from its filling position to dumping position to deposit its load, a suitable conveyer operating transversely the working and movable along a track independently of the shovel to receive the contents of the dipper.

It is thus an object of the invention to enable the excavating, the conveying and the mining or removal of the lower stratum to be carried on continuously and simultaneously without interference of the one by the other, and whereby the entire operation may be greatly cheapened and facilitated.

The invention consists in the matters hereinafter described and more fully pointed out and defined in the appended claims.

Figure 11:
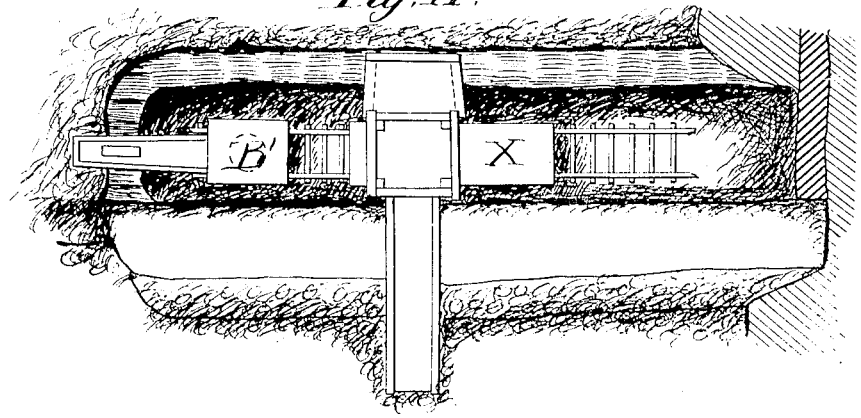
Figure 12:
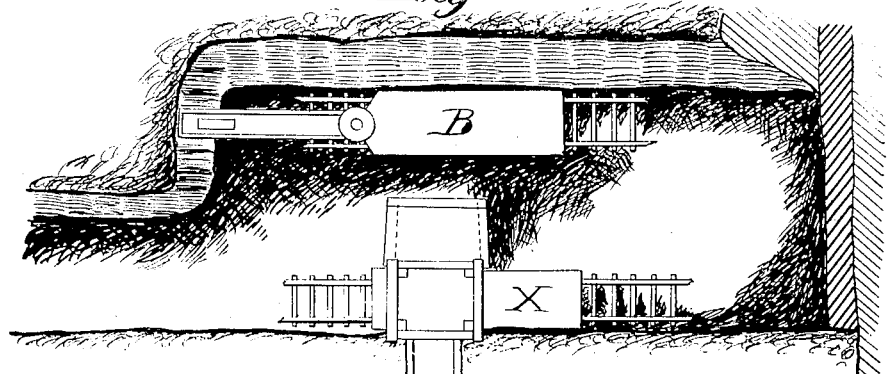

In the drawings: Figure 1 is an end elevation of the conveyer showing the same supported upon a track on the stratum to be worked as for instance a coal bed. Fig. 2 is a top plan view of the same partly broken and showing pulverizing means. Fig. 3 is a view similar to Fig. 2 with the beaters removed and illustrating a different drive for propelling the car. Fig. 4 is a side elevation of one form of power shovel embodied in my invention. Fig. 5 is a fragmentary top plan view of the same. Fig. 6 is a side elevation of a power shovel in which the shovel platform rotates. Fig. 7 is a top plan view of the same with the shovel boom removed. Fig. 8 is a vertical section of a convenient form of winch embodied in my invention. Fig. 9 is a fragmentary view illustrating the mechanism for rotating the platform and boom shown in Fig. 4. Fig. 10 is a top plan and somewhat diagrammatic view showing a shovel such as is illustrated in Fig. 4 delivering to a conveyer movable upon the same track whereby the material is delivered transversely at a considerable distance from the track. Fig. 11 is a similar view showing the shovel operating straight ahead. Fig. 12 illustrates the conjoint use of a shovel such as shown in Figs. 6 and 7 and a conveyer movable along a track parallel therewith. Fig. 13 is a view in plan and horizontal section of the transmission gear. Figs. 14 and 15 are details of a part of the adjusting mechanism for the frictions.

As shown in said drawings:—A power shovel is employed to uncover a vein of coal A, removing the superposed rocks and material A' therefrom and delivering it to a conveyer from which it is delivered to a dump A² beyond the uncovered stratum. For this purpose any suitable power shovel may be used as for instance such as indicated as a whole by B or B'. The shovel B is a familiar type the same is mounted upon a platform $b$ supported on trucks $b'$ as is usual and upon which is mounted the steam boiler $b^2$ and hoisting engines C so disposed upon the platform as to serve as a counterweight for the dipper D operated from the boom D'.

The engine as shown, though not necessarily, is a double hoisting engine the cylinders $c$—$c'$ of which are arranged horizontally and drive to a drum shaft C' on which between the connecting rods is provided a pinion $c^2$, which drives a gear $c^3$, secured on the hoisting drum $C^2$, which is journaled in advance of the main shaft C'.

At the forward end of the car is secured a circular platform or pedestal E, on which is removably mounted the boom platform E', on which is secured the lower end of the inclined boom D'. The upper end of said boom is supported at the desired inclination by means of stay rods $e$ which extends from the head of the boom rearwardly and downwardly and pivotally engage or swivel on the upper end of the mast $E^2$, the lower end of which is secured on the car at the rear of said boom platform and which inclines forwardly to a point above the center of said platform. Stay rods $e'$ extend downwardly from said mast one on each side of the car and are rigidly engaged at their rear ends to the side sills thereof. Mounted upon said boom is a thrusting engine F, on the shaft of which is provided a pinion shown in dotted lines in Fig. 6 and on which meshes the racked under side of the dipper stick $d$. A suitable cable $d'$ is secured at one end to the upper end of the boom and leads through a sheave $d^2$ in the bail of the bucket D, over a saddle sheave $d^3$, at the end of the boom and over sheaves $d^4$ and $d^5$ on said boom, and thence downwardly through the center of the boom platform to a sheave $d^6$ and thence to the hoisting drum $C^2$. Suitable operating levers G are provided and as shown an engine G' is provided connected with suitable gears, to drive a shaft $g$ journaled below the sills and from which suitable sprocket chains or other connections $g^2$ drive to the axles of one or both trucks thus making the shovel automobile and permitting the same to move in either direction. Drums $c^4$ and $c^5$ are provided on the ends of the main shaft C' and suitable lines lead to these to revolve the platform in swinging the dipper.

The construction shown in Figs. 4, 5, 8 and 9 indicates a power shovel in which the entire platform rotates upon the truck. For this purpose a single truck $b^5$ is used and pivotally supported thereon is the platform for the shovel which is journaled at the center of the truck. A boiler $b^2$ is supported upon the rear end of the platform and with the engine C affords a counterweight for the boom and the dipper. The pinion $c^2$, secured on the engine shaft, intermeshes with a gear $c^3$ on the drum shaft $c^6$ and drives the hoisting drum $C^2$. The boom $D^3$ is supported upon the front end of the platform at a suitable inclination and is provided with a saddle sheave $d^7$ at the upper end thereof on which the bucket D is suspended as before described with reference to Fig. 6. The dipper stick $d$ is also provided with a rack on the under side thereof and extends rearwardly between the legs of the boom and engages a suitable pinion shown in dotted lines in Fig. 4 and which is driven by suitable train of gears indicated as a whole by $d^8$, from an engine F' supported on the boom. Stay rods $e^3$ extend from the upper end of the boom rearwardly and engage on the rear end of the platform as shown in Fig. 4, and are each provided with a turnbuckle $e^2$ whereby they may be adjusted.

In advance of the drum shaft and parallel therewith a shaft $C^4$ is journaled on which is secured a gear $c^7$, which meshes with the gear $c^3$. Also secured on said shaft are inwardly facing bevel gears $c^8$—$c^9$ between which is provided a clutch $c^{10}$ of any suitable kind adapted to engage either to the shaft. Journaled in the platform of the car is a vertical shaft $C^5$ on the upper end of which is provided a beveled pinion $c^{11}$, which meshes with both the bevel gears $c^8$—$c^9$. At the lower end of said shaft is provided a pinion $c^{12}$ which meshes with a large gear $b^6$ rigidly secured to and concentric with said platform and which rotates the same when driven by the pinion $c^{12}$. Any suitable arrangement of operating levers and throttles may be employed and any suitable drive may be arranged to propel the trucks upon the track either by the same or separate engines.

The conveyer comprises an automobile platform car H, provided at its rear end with a steam boiler $h$ thereon and having mounted conveniently upon the car a hoisting engine I, such as before described and connected with the steam boiler in any suitable manner. A pinion $i$ is secured on the driving shaft which meshes with a gear $j$ on a winch shaft J, journaled transversely the car in advance of the middle thereof. Rigidly secured upon a sleeve $j'$ through which said winch shaft J passes is a beveled gear $j^2$. On the outer end of said sleeve is provided a friction pulley $j^3$ adapted to be engaged by complemental friction pulley $j^4$ feathered on said shaft, and which when said frictions are brought into engagement drive said bevel gear. Journaled longitudinally of the platform is a shaft K on the end of which in mesh with the gear $j^2$ is a bevel pinion $k$.

Secured upon the forward end of the car and extending transversely thereof is a conveyer indicated as a whole by L, and which comprises parallel ways or sills $l$ of any suitable length which extend laterally from the car at any desired inclination and on which are journaled transverse rollers $l'$ the ends of which are greater in diameter than the portion intermediate the ends. Trained over the said rollers longitudinally of the ways and around suitable rollers of larger diameter $l^2$ at the outer end of the ways and corresponding roller $l^3$, at the inner end thereof near the opposite side of the car is a conveyer belt $l^4$. A frame L' is provided on said end of the car and extending above the inner end of said conveyer and rods or cables $l^5$—$l^6$ are secured at the outer end and intermediate the ends of the conveyer and secured on said frame to support said outer end. As shown also at the side of the car opposite the conveyer and supported at its outer end on said frame by means of rods or cables $l^7$ is a counterweight platform $L^2$ which may be of any desired size and upon which may be loaded rock or any desired material to serve as a balance for the weight of the conveyer and its load.

Above the inner end of the conveyer upon the car is a hopper comprising side members $l^8$ rigidly secured to said frame and to the ways of the conveyer, and which serve to direct all material delivered thereto upon the middle of the belt. As shown the roller or pulley $l^2$ at the outer end of the conveyer is driven by means of a grooved sheave $l^9$ on the end of its shaft about which and a corresponding sheave $k^2$ on the end of the shaft K, is trained a cable to afford a rope drive though obviously sprocket wheels and a sprocket chain may be used for this purpose if desired.

It is sometimes desired to break up the material or pulverize it before delivery to the conveyer. For this purpose parallel beater shafts M—M' are journaled in said hopper above the belt, and inclined beaters are secured thereon. Said shafts are rotated oppositely by means of a shaft $m'$ journaled parallel therewith and driven by means of suitable sprocket wheel thereon and on said winch shaft J by means of sprocket chain $m^2$. On the outer end of said shaft $m'$ is a gear $m^3$, which meshes with one of the corresponding intermeshing gears $m^4$ on the ends of the beater shafts M and M'.

Any suitable shifting mechanism may be employed. As shown in Figs. 8, 14 and 15 however, a thrust rod O extends axially into the shaft J and engages a block $o$ which extends transversely through the shaft and bears against the outer side of the friction $j^4$, said rod O extends into a casing $o'$ and is provided with a circular head $o^2$ thereon against which presses a circular head $o^3$ having balls therebetween to reduce friction. The head O' of the casing $o'$ supports a bearing $o^4$ for a threaded shaft $o^5$ which is threaded therethrough and extends through the head into a bearing in the head $o^3$ and by inward rotation forces the friction $j^4$ against its complemental member $j^3$ driving the gear $j^2$. In a similar manner the friction $o^6$ may be engaged on the complemental face of the gear $j$ of course compressed air may be used in said casing $o'$ if desired instead of the screw $o^5$. The head $o'$ is held from rotation in either case by the teeth $o^8$ which mesh with teeth $o^9$ on the head O'. Means are also provided for propelling said car by the engine whereby the conveyer is operated. For this purpose a sprocket wheel is provided on the driving shaft of the engine and on a shaft N of a transmission mechanism and about the same is trained a sprocket chain $n$ so that said shaft N is driven continuously when the engine is in operation. Journaled in the transmission frame $n'$ are shafts N' and $N^2$ parallel with the shaft N, and provided each with intermeshing gears $n^2$—$n^3$ of which the gear $n^2$ is in mesh with a pinion $n^4$ on the shaft N so that said gears rotate continuously on their shafts. Rotatable on said gear shafts N' and $N^2$ are concave frictions $n^5$—$n^6$ each provided with a pinion $n^7$ and $n^8$ rigidly engaged thereto and which mesh with a gear $n^9$ rigidly secured on a shaft $N^3$ journaled below the platform. Each of said frictions $n^5$—$n^6$ are arranged to engage respectively complemental convex faces $n^{11}$ on the adjacent side of the gear on the same shaft, and any suitable mechanism may be employed to shift either the concave friction or the gear longitudinally of the shaft into frictional engagement, thereby driving the shaft $N^3$ either forwardly or in reverse dependent upon which of said frictions is engaged. As shown sprocket wheels are provided on the inner end of the shaft $N^3$, which drive to corresponding sprocket wheels on the axles of the rear truck by means of sprocket chains $n^{10}$.

In the constructions in which the beaters are not required the transmission before described may be omitted and in such case the sprocket wheel on the winch shaft is utilized to drive a sprocket chain $n^{20}$ which is trained around a corresponding sprocket wheel on one of the truck axles as shown in Fig. 3.

The operation is as follows: Referring to Figs. 1, 10, 11 and 12 in stripping, a track is laid upon the vein or stratum uncovered and a shovel such as the type shown in Figs. 6 and 7 and 12 or shown in Figs. 4, 5, 10 and 11 is operated on said track to strip the superposed material from the coal or other material and delivers the same into the conveyer indicated as a whole by X, which may be movable along the same track as shown in Figs. 10 and 11 or upon a parallel track as shown in Figs. 12, if the shovel B is used. As the excavated material is delivered into the hopper the conveyer transports the same laterally for any desired distance within its range and deposits it beyond the edge of the working as shown in Figs. 10, 11 and 12. This enables said material to be carried over the track on which cars for the mined material A is removed and thus the work of those removing the coal is independent of the stripping and all three operations continue simultaneously, neither the excavating nor the conveying interfering in any manner with the removal of the vein. Inasmuch as the shovel and the conveyers are all automobile and moved along the track under their own power as the work progresses no delay for shifting is necessary.

Obviously any suitable revolving or swinging shovel may be used for the purpose, and many details of construction in the conveyer may be varied without departing from the principles of my invention.

I claim as my invention:—

1. A device of the class described embracing a car, a power operated conveyer acting transversely of the car to receive the material from the workings and deliver the same at a distance laterally thereof, means for breaking up the material before delivery upon the conveyer and a counterbalance for the conveyer pivoted to the car.

2. A device of the class described embracing a car, movable under its own power, a power operated conveyer on and acting transversely the car to receive material from an excavator and deliver the same at a distance laterally thereof, a winch, flexible driving connections between the same and the car axle and flexible driving connections between said winch and conveyer.

3. A device for the purpose specified embracing a car movable under its own power, a power operated belt conveyer supported on and acting transversely the car to receive the material from an excavator and deliver the same at a distance beyond the working and means for separating the material before delivery upon the conveyer.

4. A device for the purpose specified embracing a car movable under its own power, a power operated belt conveyer supported on and acting transversely the car to receive the material from a shovel and deliver the same at a distance beyond the working, a hopper on the car above the conveyer and means operating in the hopper to break the material.

5. A device for the purpose specified embracing a car, a power operated conveyer supported on said car and acting to receive the material from a shovel and deliver the same at a distance beyond the working and a counterbalance pivoted on the opposite side the car from the conveyer.

6. A mechanism for the purpose specified embracing a car movable under its own power, a transversely operating conveyer thereon, a hopper above the same to receive the material from a working and deliver it into the conveyer, and a hinged counterweight extending on the opposite side of the car from the conveyer and mechanism on the car for actuating the conveyer.

7. In mechanism for the purpose specified a car movable under its own power, a conveyer thereon extending transversely the car, a hopper above the conveyer to receive the material from a shovel and deliver it into the conveyer, a hinged counterweight extending on the opposite side of the car from the conveyer, means in the hopper for breaking the material and mechanism on the car for actuating the conveyer and breaking means.

8. In mechanism for conveying a car movable under its own power, a conveyer thereon acting to deliver beyond the working, a hopper on the car above the conveyer to receive the material from an excavator, and deliver it to the conveyer, a hinged counterweight extending on the opposite side of the car from the conveyer and an engine on the car for actuating the conveyer and moving the car.

9. In mechanism of the class described a car movable under its own power, a conveyer thereon acting to deliver laterally of the car beyond the working, a hopper on the car adapted to receive the material from a shovel and deliver it to the conveyer, a hinged counterweight extending on the opposite side of the car from the conveyer, means in the hopper to break the material, an engine and mechanisms operated thereby for actuating the car, the breaking means and the conveyer.

10. In a mechanism of the class described a car, mechanism thereon for propelling the same, a belt conveyer supported on the car and extending at a distance laterally thereof, means for driving said conveyer, a hopper adapted to receive the material thereinto and rotatable mechanism in the hopper through which the material passes.

11. In a mechanism of the class described a self propelled car, a belt conveyer supported on the car and extending at a distance laterally thereof, a hopper above the receiving end of the conveyer, operative connections for driving the said conveyer by the motor that propels the car and means on the opposite end of the car from the conveyer and hopper adapted to supply motive fluid to the motor and to counterbalance the conveyer.

12. In mechanism for the purpose specified a self propelled car, a belt conveyer supported on the car and extending at a distance laterally thereof, operative connections for driving the said conveyer from the propelling motor for the car, a hopper adapted to receive the material and deliver the same into the conveyer and means in the hopper to break the material.

13. In mechanism for the purpose specified a car, an engine thereon, operative connections therewith to propel the car, a belt conveyer supported on and extending at a distance laterally of the car, operative connections with said engine for driving the said conveyer, a hopper adapted to receive the material thereinto and a hinged counterweight on the side of the car opposite the extension of the conveyer.

14. In mechanism for the purpose specified the combination with the car, of a motor thereon connected to propel the same, a conveyer extending laterally from the car, a hopper to receive material thereinto, beaters operating in said hopper to pulverize materials delivered thereinto, operative connections with said motor to drive said beaters and conveyer and a counterweight supported on the opposite side of the car from the extension of the conveyer.

15. In mechanism for the purpose specified a car, a boiler and engine thereon, operative connection with said engine for propelling the car, a laterally extended inclined conveyer supported on the opposite end of the car, a frame extending above the same, tension rods connected at the outer end of the conveyer and on said frame, to regulate the height thereof, a counterweight platform extending on the opposite side the car from the conveyer, tension rods connected over the frame and with said platform and beaters rotatable above said conveyer to pulverize material delivered thereinto and operative connection for driving said conveyer and beaters from said engine.

16. A conveying mechanism for the purposes specified embracing a car, a conveyer wholly supported thereon and extending outwardly from the car, cables secured to the end of the conveyer and to the car, an engine on the car and operative connections for driving the conveyer and propelling the car from the engine.

17. A conveying mechanism for the purposes specified embracing a car, a conveyer supported thereby extending outwardly over a side thereof, a counterbalance secured to the opposite side of the car, means at the end of the car opposite the conveyer adapted to counterbalance the same and supply the motive fluid and mechanism intermediate the ends of the car for actuating the conveyer and the car.

18. A mechanism of the class described embracing a car, a frame secured thereto, a conveyer supported entirely by the car, bracing means secured to the conveyer and to the frame, an adjustable platform opposite the conveyer for supporting ballast and means for actuating the conveyer.

19. In a device of the class described the combination with a car, ways secured thereto at one end and extending outwardly, transversely thereof, rollers journaled on the ways, a conveyer belt trained therearound, means affording a counterbalance for the ways and conveyer, a boiler secured to the car acting as a counterbalance for the conveyer and aforesaid counterbalancing means and an engine supplied thereby for driving the conveyer and propelling the car.

20. In a device of the class described a car, conveying mechanism wholly supported thereby, and extending outwardly therefrom, means opposite the conveying mechanism affording a counterbalance, driving mechanism and flexible transmission mechanism between the driving mechanism and the car and conveyer.

21. In a device of the class described a car, conveying mechanism wholly supported thereby and extending outwardly therefrom, means opposite the conveying mechanism affording a counterbalance, a hopper above the conveyer and rotating pulverizing or breaking mechanism therein.

22. In a device of the class described a car, conveying mechanism wholly supported thereby and extending outwardly therefrom, means opposite the conveying mechanism affording a counterbalance, a hopper above the conveyer, rotating pulverizing or breaking mechanism therein, a driving engine on the car and operative connections adapted to actuate the conveyer and the pulverizing mechanism and to propel the car from said engine.

23. In a device of the class described a car, a boiler supported thereon, an engine connected therewith, a winch operated from the engine shaft, a conveyer extending transversely of the car, a platform pivoted to the car and operative connections for driving the conveyer from the winch.

24. In a device of the class described a car, a boiler supported thereon, an engine connected therewith, a winch operated from the engine shaft, a conveyer extending transversely of the car, a platform pivoted to the car, operative connections for driving the conveyer from the winch, and pulverizing mechanism operated from the winch shaft.

25. In a device of the class described the combination with a track of a car thereon, a conveyer supported by the car, means bracing the outer end thereof from the car, a hopper above the inner end of the conveyer, an engine on the car, a winch operated thereby, operative connections between the winch and conveyer, a winch also driven from the engine shaft and operative connections between the same and car axles for propelling the car in either direction.

26. In a device of the class described the combination with a track of a car thereon, a conveyer supported by the car, means bracing the outer end thereof from the car, a hopper above the inner end of the conveyer, an engine on the car, a winch operated thereby, operative connections between the winch and conveyer, a winch also driven from the engine shaft, operative connections between the same and car axles for propelling the car in either direction, rollers journaled in the hopper, blades secured thereto and a counterbalance for the conveyer.

27. In a device of the class described the combination with a car, a conveyer thereon, a hopper into which an excavator is adapted to empty for delivering material upon the conveyer, counterbalancing means for the conveyer, an engine secured on the car, a winch driven thereby and operative connections for driving the conveyer and the car from said winch.

28. A conveying mechanism embracing a car, a conveyer thereon, counterbalancing means therefor, power operated mechanism for propelling the car and driving the conveyer and means for bracing the conveyer, counterbalancing means and means for breaking up the material.

29. A conveying mechanism embracing a car, a conveyer thereon, counterbalancing means therefor, power operated mechanism for propelling the car and driving the conveyer, pulverizing mechanism adapted to act on material prior to delivery upon the conveyer, means operating the same and counterbalancing means for the conveyer and aforesaid counterbalancing means.

30. A conveying mechanism embracing a car, an endless conveyer extending transversely thereof, a counterbalance for the conveyer, a frame secured to the car, cables rigidly secured thereto and to the conveyer and counterbalance and power operated mechanisms for operating the cars in either direction.

31. A conveying mechanism embracing a car, an endless conveyer extending transversely thereof, a counterbalance for the conveyer, a frame secured to the car, cables rigidly secured thereto and to the conveyer and counterbalance, power operated mechanisms for operating the cars in either direction, pulverizing means through which the material passes prior to delivery upon the conveyer and power operated mechanism for actuating the conveyer and pulverizing means.

32. In a device of the class described a car, a conveyer thereon adapted to deliver material at a suitable distance therefrom, means bracing the conveyer, a winch, operative connections between the same and conveyer for actuating said conveyer and operative connections between said winch and an axle of the car for propelling the same.

In testimony whereof, I have hereunto subscribed my name in the presence of two subscribing witnesses.

MORTON E. PUGH.

Signed in the presence of—
J. W. ANGELL,
R. E. HANNAH.